(12) United States Patent
Mabuchi

(10) Patent No.: US 10,070,087 B2
(45) Date of Patent: *Sep. 4, 2018

(54) SOLID-STATE IMAGING DEVICE AND IMAGING APPARATUS

(71) Applicant: SONY CORPORATION, Tokyo (JP)

(72) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,669

(22) Filed: Feb. 28, 2017

(65) Prior Publication Data

US 2017/0171490 A1 Jun. 15, 2017

Related U.S. Application Data

(63) Continuation of application No. 14/767,055, filed as application No. PCT/JP2014/000734 on Feb. 13, 2014, now Pat. No. 9,621,833.

(30) Foreign Application Priority Data

Feb. 21, 2013 (JP) .................................. 2013-032089

(51) Int. Cl.
H04N 3/14 (2006.01)
H04N 5/335 (2011.01)
(Continued)

(52) U.S. Cl.
CPC ......... *H04N 5/37455* (2013.01); *H04N 5/378* (2013.01); *H04N 5/3742* (2013.01);
(Continued)

(58) Field of Classification Search
CPC .... H04N 5/3532; H04N 5/3535; H04N 5/374; H04N 3/1506; H04N 3/1575; H04N 3/1512
(Continued)

(56) References Cited

U.S. PATENT DOCUMENTS 9,621,833 B2 * 4/2017 Mabuchi ............. H04N 5/3742
2009/0153711 A1 * 6/2009 Lee ...................... H04N 3/155
348/302

(Continued)

FOREIGN PATENT DOCUMENTS

CN 101964877 2/2011
CN 102468316 5/2012

OTHER PUBLICATIONS

Official Action (with English translation) for Chinese Patent Application No. 201480005997.8 dated Nov. 3, 2017, 33 pages.

*Primary Examiner* — Kelly L Jerabek
(74) *Attorney, Agent, or Firm* — Sheridan Ross P.C.

(57) ABSTRACT

An imaging device includes a pixel region in which light sensing pixels are grouped into pixel-units that each include multiple pixels, each column including pixels from at least two of the pixel-units. Each of the pixel-units is connected, via a corresponding readout line, to a corresponding readout unit configured to perform analog-to-digital conversion on pixel signals output thereto. A scanning unit that extends in a column direction is configured to select pixels for readout by applying row scanning pulses to scan lines connected to rows. A scanning unit that extends in a row direction for applying readout-enabling scan pulses to lines connected to columns is omitted. Those pixels that are selected for readout by one of the row scanning pulses are read out independently of any enabling pulses applied to lines connected to columns.

9 Claims, 13 Drawing Sheets

(51) Int. Cl.
- *H04N 5/3745* (2011.01)
- *H04N 5/374* (2011.01)
- *H04N 5/376* (2011.01)
- *H04N 5/378* (2011.01)
- *H04N 5/63* (2006.01)

(52) U.S. Cl.
CPC ....... *H04N 5/3765* (2013.01); *H04N 5/37457* (2013.01); *H04N 5/63* (2013.01)

(58) Field of Classification Search
USPC .................. 348/296, 302–304, 308–310
See application file for complete search history.

(56) References Cited

U.S. PATENT DOCUMENTS

| | | | |
|---|---|---|---|
| 2010/0320516 A1* | 12/2010 | Fereyre | H01L 27/14603 257/292 |
| 2011/0019038 A1* | 1/2011 | Okuno | H01L 27/14609 348/246 |
| 2012/0057056 A1* | 3/2012 | Oike | H01L 27/14634 348/294 |
| 2012/0120293 A1* | 5/2012 | Mabuchi | H01L 27/14632 348/302 |
| 2014/0063304 A1* | 3/2014 | Manabe | H04N 5/3745 348/296 |

* cited by examiner

PRIOR ART

PRIOR ART

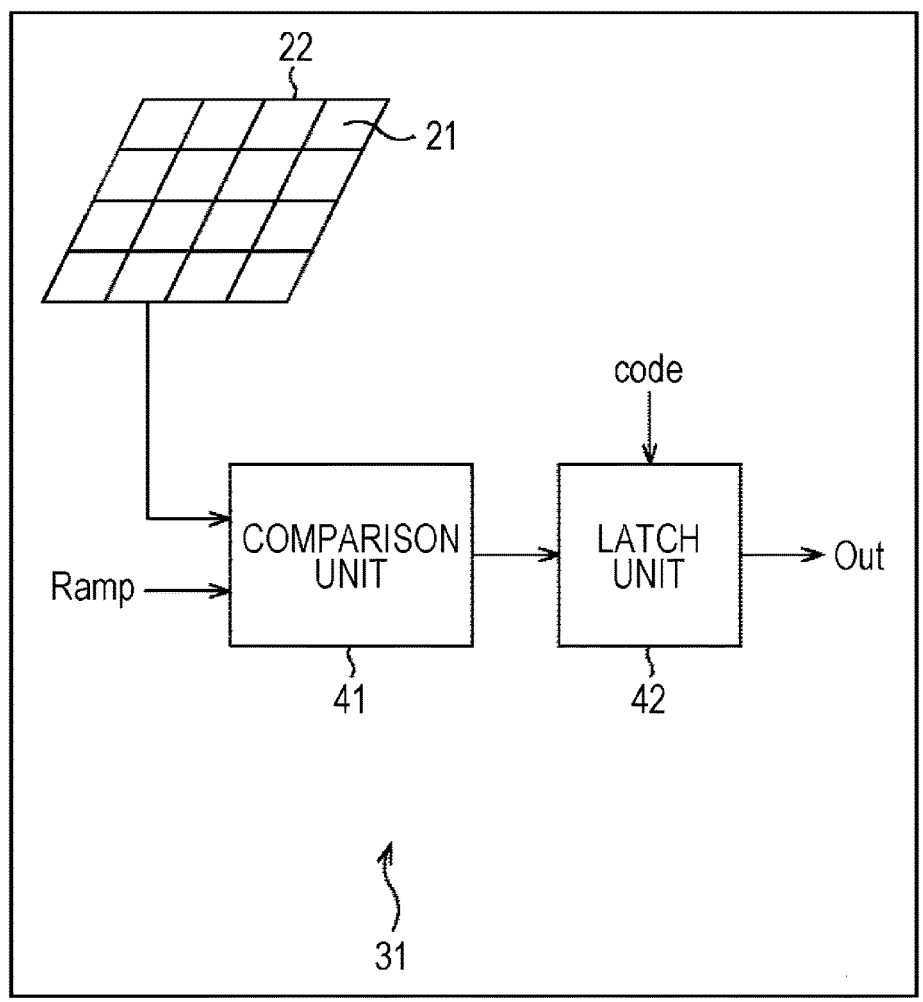
PRIOR ART

PRIOR ART

[Fig. 6B]

SOLID-STATE IMAGING DEVICE AND IMAGING APPARATUS

CROSS REFERENCE TO RELATED APPLICATIONS

This application is a continuation of U.S. patent application Ser. No. 14/767,055, filed Aug. 11, 2015, which is national stage application under 35 U.S.C. 371 and claims the benefit of PCT Application No. PCT/JP2014/000734 having an international filing date of Feb. 13, 2014, which designated the United States, which PCT application claimed the benefit of Japanese Patent Application No. 2013-032089 filed Feb. 21, 2013, the disclosures of which are incorporated herein by reference in their entirety.

TECHNICAL FIELD

The present disclosure relates to a solid-state imaging device and an imaging apparatus, and in particular to a solid-state imaging device which is preferable when providing an Analog-Digital (AD) conversion unit in each pixel block which is formed by a plurality of pixels.

BACKGROUND ART

As a solid-state imaging device which is mounted on a digital still camera, or a digital video camera, a CMOS image sensor (hereinafter, abbreviated to CIS) has been known. In addition, the CIS is used in an imaging apparatus for sensing, and in a case of such a use, rapidity of operations is particularly necessary.

For acceleration of operations of the CIS, a method in which an AD conversion unit (hereinafter, abbreviated to ADC) is provided to one, or a relatively small number of pixels, and a plurality of the ADCs are operated in parallel has been known.

In such a method, optical characteristics of pixels are sacrificed when providing the ADC in the same substrate of the pixel.

Therefore, a configuration in which pixels and ADCs are provided on separate substrates, and both the substrates are connected by being bonded using Cu—Cu bonding in order not to sacrifice optical characteristics of the pixels has been proposed. In addition, since a size of one ADC usually corresponds to a size of a plurality of pixels, the plurality of pixels on the separate substrate are correspondingly connected to the one ADC (for example, refer to PTL 1).

FIG. 1 is a conceptual diagram of a CIS in which pixels and ADCs are provided on different substrates. That is, the CIS 10 is configured by an upper substrate 11 and a lower substrate 12, and the upper substrate 11 and the lower substrate 12 are bonded using Cu—Cu bonding, or the like, and are connected to each other at corresponding portions.

FIGS. 2A and 2B schematically illustrate respective circuit configurations of the upper substrate 11 and the lower substrate 12 of the CIS 10.

As illustrated in FIG. 2A, a plurality of pixels 21 which are arranged in a matrix, a vertical scanning unit 23, and a horizontal scanning unit 24 are provided on the upper substrate 11. Each of the plurality of pixels 21 is divided into one pixel block 22 by 4*4 pixels according to an ADC 31 which will be described later. The pixel 21 generates a charge corresponding to input light using photoelectric conversion processing, accumulates the charge, and transmits a pixel signal corresponding to the accumulated charge to the ADC 31 of the lower substrate 12 at a scanning timing based on a control from the vertical scanning unit 23 and the horizontal scanning unit 24.

As illustrated in FIG. 2B, the lower substrate 12 is provided with the plurality of ADCs 31 which respectively correspond to the pixel block 22 of the upper substrate 11, a digital signal processing unit 32, a timing generation unit 33, and a DAC 34. Each ADC 31 converts analog pixel signals which are sequentially transmitted from the plurality of pixels 21 which belong to corresponding pixel block 22 into a digital signal.

For example, a pixel block 22 on the upper left of the upper substrate 11 corresponds to an ADC 31a on the upper left of the lower substrate 12. In addition, similarly, a pixel block 22 on the upper right of the upper substrate 11 corresponds to an ADC 31e on the upper right of the lower substrate 12. That is, respective occupying areas and shapes thereof of a pixel block 22 on the upper substrate 11 and an ADC 31 on the lower substrate 12 are set so as to match with each other.

FIG. 3 illustrates a configuration example of the ADC 31. The ADC 31 includes a comparison unit 41 and a latch unit 42. The comparison unit 41 compares analog pixel signals which are sequentially transmitted from each pixel 21 of a corresponding pixel block 22 with a Ramp signal which is input from the DAC 34, and outputs a comparison result thereof to the latch unit 42. The latch unit 42 maintains an input code value when a Ramp signal crosses the pixel signal based on the comparison result of the comparison unit 41. The code value which is maintained in the latch unit 42 is read out in the digital signal processing unit 32 as a digital pixel signal.

FIG. 4 illustrates general scanning order of 4*4 pixels which configure a pixel block 22. In the figure, a rectangle of a thin line denotes a pixel 21, a thick line denotes a pixel block 22 which is correlated with one ADC 31, numbers denote positions of pixels, and arrows denote scanning order of pixels. In addition, a pixel located on an X row and a Y column is also described as a pixel (X,Y).

For example, in a pixel block of which a pixel (0,0) is on the upper left top, scanning is started in the right horizontal direction by setting a pixel on the upper left (0,0) as the starting point, and a row to be scanned is moved in the lower vertical direction sequentially, and the lower right pixel (0,3) is lastly read out. Similarly, in another pixel block 22, as well, scanning is started in the right horizontal direction by setting a pixel 21 on the upper left, a row to be scanned is sequentially moved in the lower vertical direction, and a pixel 21 on the lower right is lastly read out.

FIG. 5 illustrates a configuration example of each pixel 21 for changing scanning order in a pixel block 22 to the horizontal direction and the vertical direction, as illustrated in FIG. 4.

A pixel 21 is configured by a photodiode (PD) 51, a transfer gate (Trf) 52, a floating diffusion (FD) 53, an amplification transistor (Amp) 54, a selection transistor for vertical scanning (Sel) 55, a selection transistor for horizontal scanning (Sel) 56, a reset transistor (Rst) 57, power source wiring 58, and a signal line 59.

In the pixel 21, a charge which is generated in the PD 51 as a photoelectric conversion device is transmitted to the FD 53 which is connected to a gate of the Amp 54 through the Trf 52. At this time, when the Sel 55 which is controlled by the vertical scanning unit 23, and the Sel 56 which is controlled by the horizontal scanning unit 24 are turned on, the Amp 54 outputs a voltage signal corresponding to a potential of the charge which is maintained in the FD 53 to an ADC 31 in the rear stage through the vertical signal line 59. In addition, the charge which is accumulated in the FD 53 is thrown away in the power source wiring 58 when the Rst 57 is turned on.

CITATION LIST

Patent Literature

PTL 1: Japanese Unexamined Patent Application Publication No. 2009-177207

SUMMARY OF INVENTION

Technical Problem

As illustrated in FIG. 5, for example, two selection transistors (Sel 55, 56) are necessary for the pixel 21 in order to execute scanning order which is illustrated in FIG. 4, and as illustrated in FIGS. 2A and 2B, for the entire CIS 10, the horizontal scanning unit 24 and the vertical scanning unit 23 are necessary. Accordingly, it has been difficult to realize miniaturization, or reducing in cost in the pixel unit and the CIS unit.

In addition, for the entire CIS, for example, it is also possible to configure the CIS only by the vertical scanning unit by omitting the horizontal scanning unit, however, it is difficult to realize miniaturization thereof in the pixel unit, even in this case, since four different Sel wirings are necessary in each row of a pixel block of 4*4 pixels.

In addition, when a pixel block 22 of 4*4 pixels is connected to one ADC 31 by being correlated therewith, a vertical signal line 59 of each pixel 21 is once put together in a center of the pixel block 22, or the like. However, in this case, there is a problem in that a layout of wiring of each pixel 21 becomes non-symmetrical, and optical and electrical characteristics become slightly different due to positions of pixels.

The present disclosure has been made in consideration of such a situation, and made so as to realize miniaturization of a pixel or a CIS, and reducing in cost, or uniformity of characteristics between pixels.

Solution to Problem

According to one exemplary illustration of the present disclosure, an imaging device may include a pixel region that includes a plurality of pixels arranged in a matrix form in rows and columns and grouped into pixel-units that each include N pixels. N may be greater than 1, each of the columns may include pixels from at least two of the pixel-units, and each of the plurality of pixels may be configured to sense light and output a pixel signal to one of a plurality of readout lines, each of the plurality of readout lines being connected to the pixels of a corresponding one of the pixel-units. The imaging device may include a scanning unit that extends in a column direction and that is configured to select pixels for readout by applying scanning pulses to scan lines that are each connected to a corresponding row of pixels. The imaging device may include a plurality of readout units, each connected to a corresponding one of the plurality of readout lines and configured to perform analog-to-digital conversion on pixel signals output thereto. There is no scanning unit that extends in a row direction and that applies pulses to lines connected to columns of pixels for enabling said selecting pixels for readout.

According to another exemplary illustration of the present disclosure, an electronic apparatus may include an imaging device as described above with respect to the first exemplary illustration of the present disclosure.

According to another exemplary illustration of the present disclosure, a method of driving an image sensor is provided. The image sensor may include a pixel region that includes a plurality of pixels arranged in a matrix form in rows and columns and grouped into pixel-units that each include N pixels, where N>1, each of the columns includes pixels from at least two of the pixel-units, and each of the plurality of pixels is configured to sense light and output a pixel signal to one of a plurality of readout lines, each of the plurality of readout lines being connected to the pixels of a corresponding one of the pixel-units; and a plurality of readout units, each connected to a corresponding one of the plurality of readout lines and configured to perform analog-to-digital conversion on pixel signals output thereto. The method may include selecting pixels for readout by applying scanning pulses to scan lines that are each connected to a corresponding row of pixels. The aforementioned selecting pixels for readout does not depend upon the application of any pulses to a line that is connected to a column of pixels.

According to another exemplary illustration of the present disclosure, an imaging device may include pixel region that includes a plurality of pixels arranged in rows and columns and grouped into pixel-units that each include N pixels. N may be greater than 1, each of the columns may include pixels from at least two of the pixel-units, and each of the plurality of pixels may be configured to sense light and output a pixel signal to one of a plurality of readout lines when selected for readout, each of the plurality of readout lines being connected to the pixels of a corresponding one of the pixel-units. The imaging device may include a scanning unit that extends in a column direction and that is configured to select pixels for readout by applying scanning pulses to scan lines that are each connected to a corresponding row of pixels. The imaging device may include a plurality of readout units, each connected to a corresponding one of the plurality of readout lines and configured to perform analog-to-digital conversion on pixel signals output thereto. Each scanning pulse may select for readout those pixels that are connected to the scan line to which the respective scanning pulse is applied independently of any other selection signal.

Advantageous Effects of Invention

According to the embodiments of the present disclosure, it is possible to realize miniaturization, reducing in cost, and uniformity of characteristics between pixels.

BRIEF DESCRIPTION OF DRAWINGS

FIG. 3 is a block diagram which illustrates a configuration example of an ADC.

DESCRIPTION OF EMBODIMENTS

Hereinafter, best forms for executing the present disclosure (hereinafter, referred to as embodiments) will be described in detail with reference to drawings.

Embodiment

<Configuration Example of CIS as Embodiment of Present Disclosure>

Figure 1:
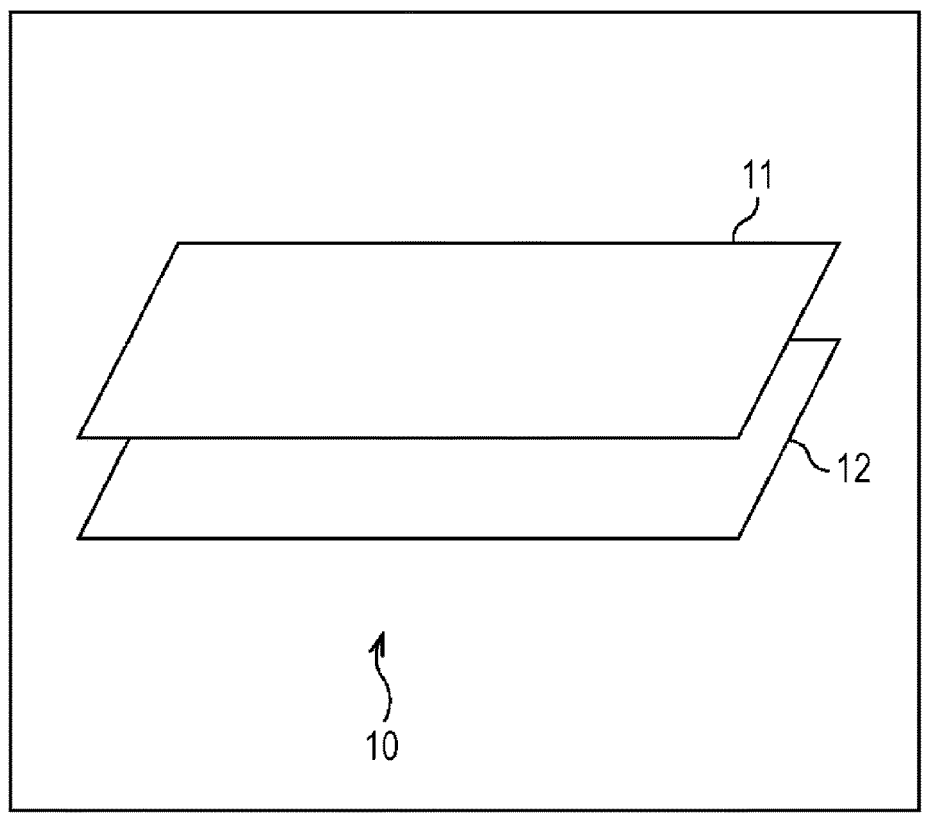
FIG. 1 is a conceptual diagram of a CIS in the related art which is configured by the upper substrate and the lower substrate.
Figure 2A:
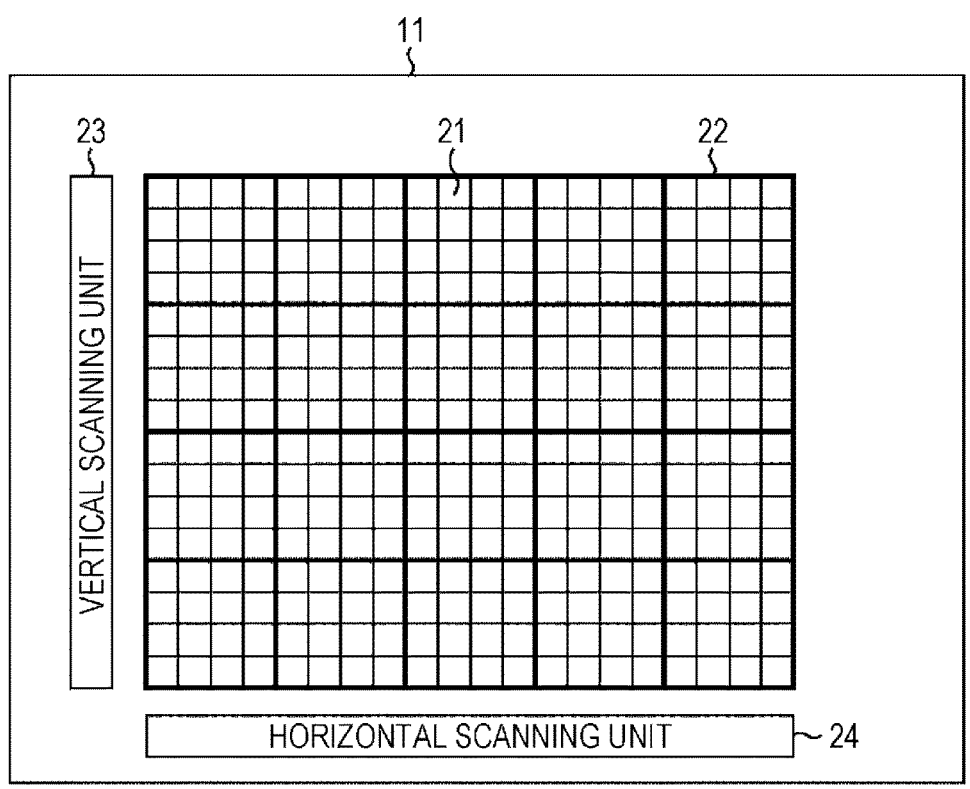
FIG. 2A is a block diagram which illustrates a configuration example of the upper substrate of the CIS in FIG. 1.
Figure 2B:
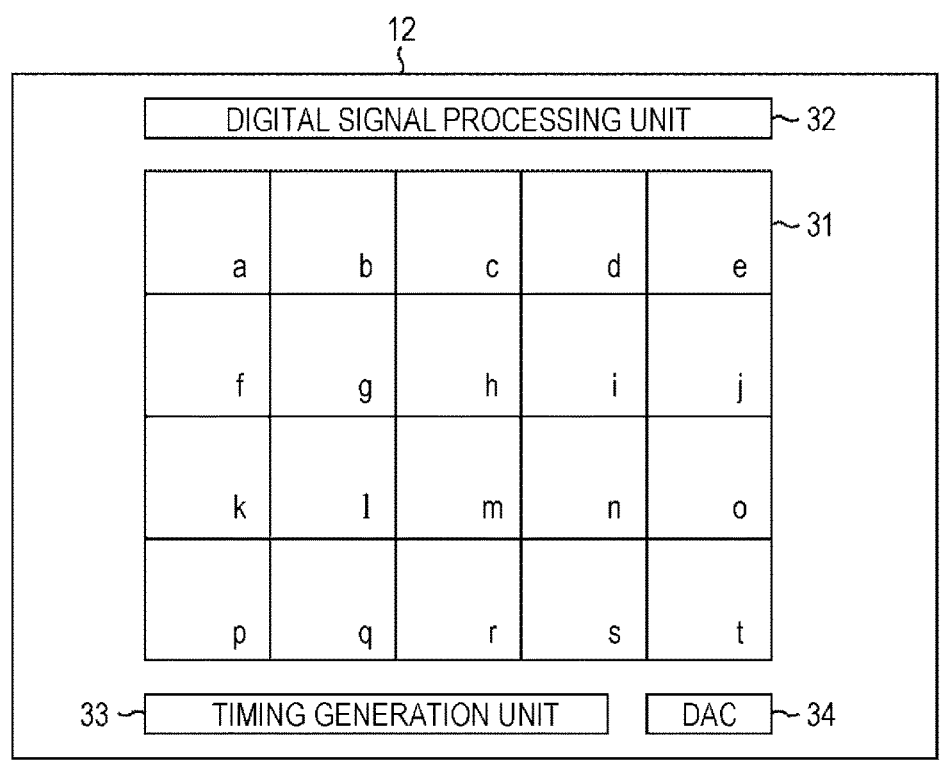
FIG. 2B is a block diagram which illustrates a configuration example of the lower substrate of the CIS in FIG. 1.
Figure 4:
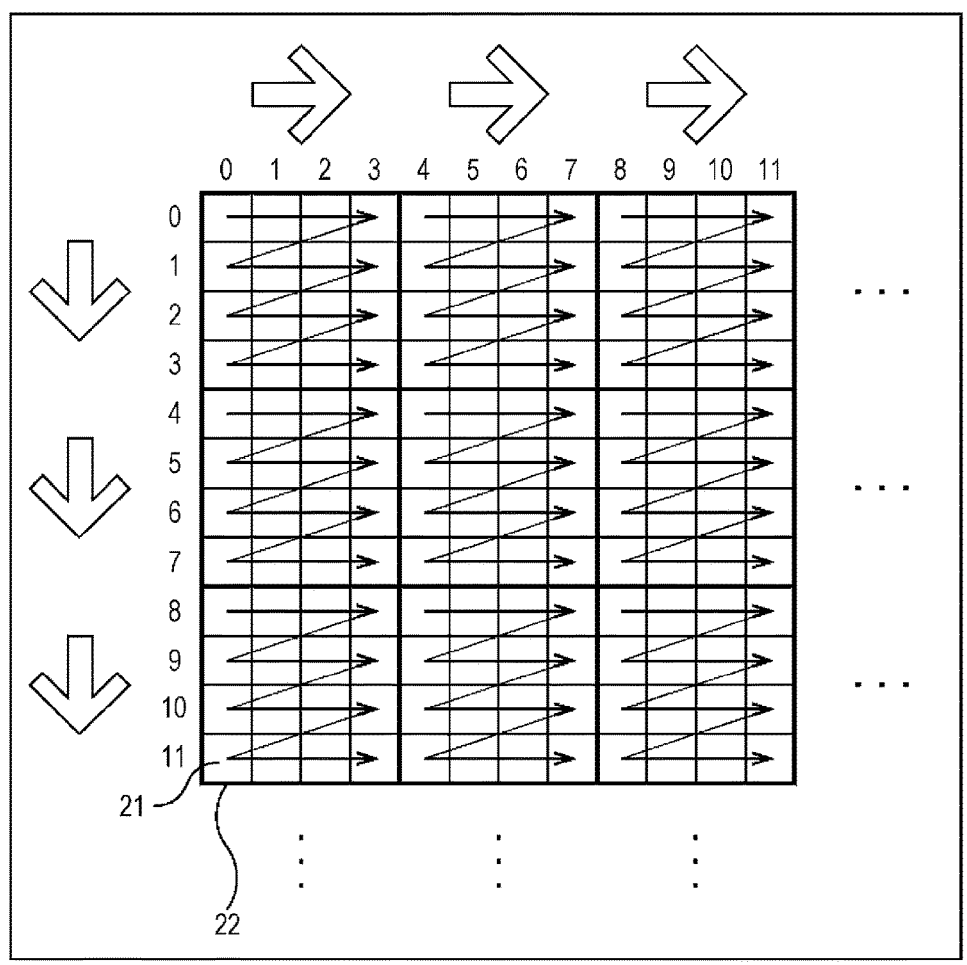
FIG. 4 is a diagram which illustrates scanning order of pixels in each pixel block in FIG. 2A.
Figure 6A:
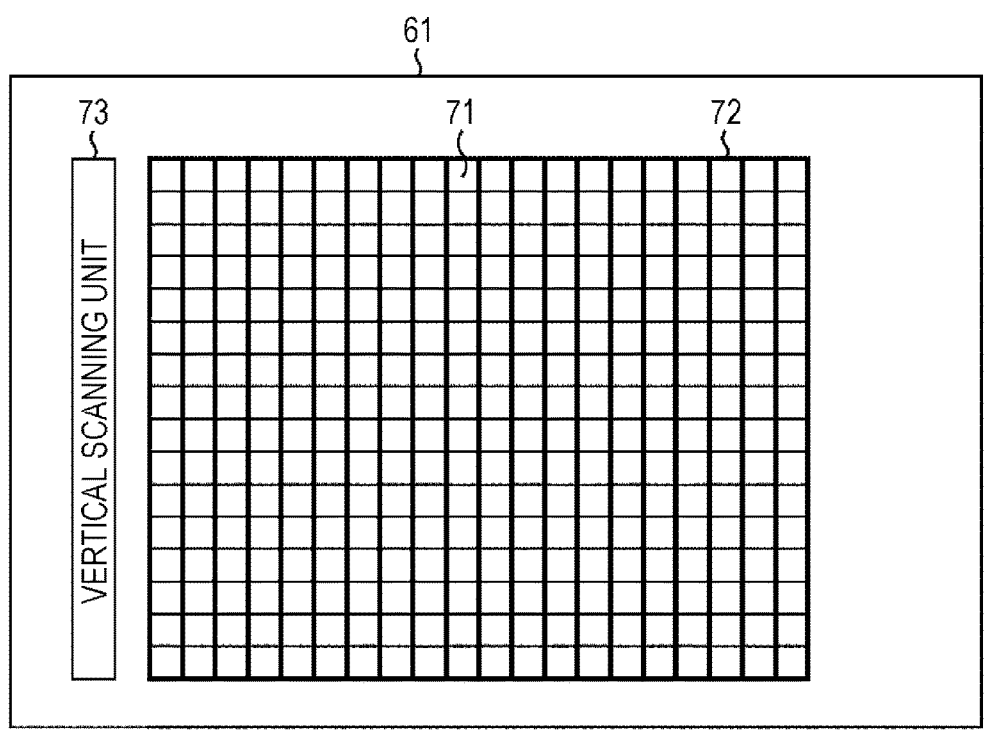
FIG. 6A is a block diagram which illustrates a configuration example of the upper substrate of the CIS to which the present disclosure is applied.
Figure 6B:
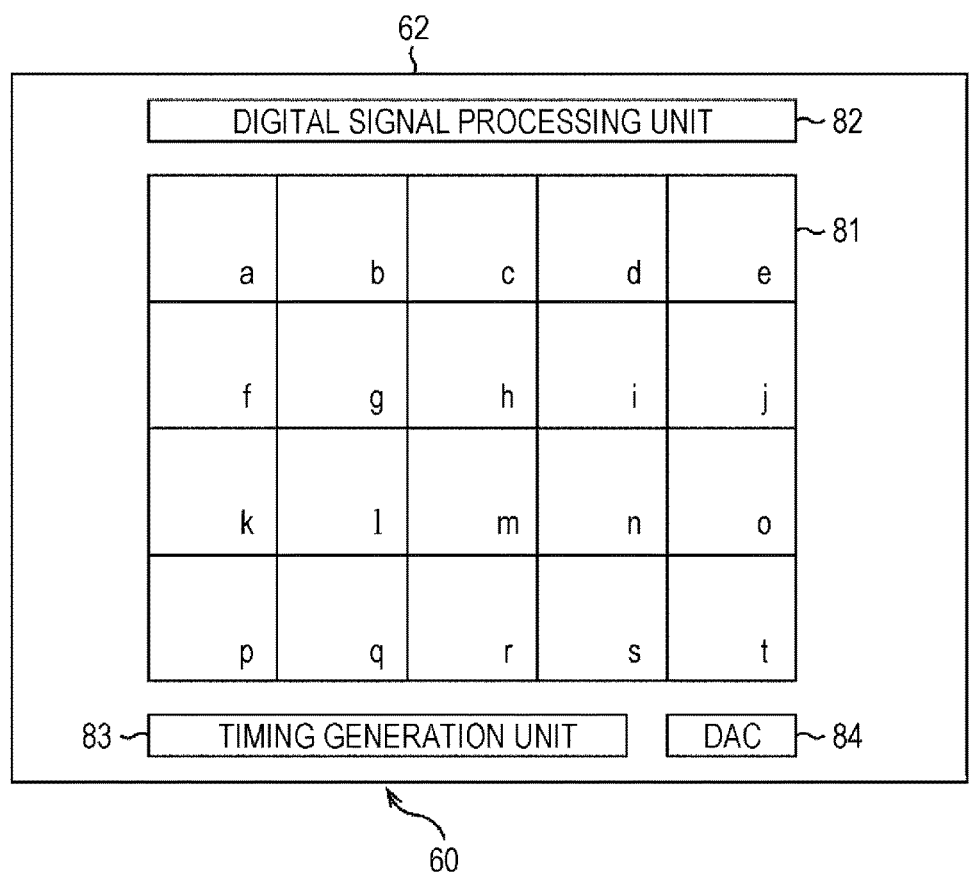
FIG. 6B is a block diagram which illustrates a configuration example of the lower substrate of the CIS to which the present disclosure is applied.

FIGS. 6A and 6B are diagrams which schematically illustrate a circuit configuration of each of an upper substrate 61 and a lower substrate 62 of a CIS 60 as an embodiment of the present disclosure. In addition, the upper substrate 61 and the lower substrate 62 of the CIS 60 are bonded using Cu—Cu bonding, or the like, similarly to the CIS 10 in FIG. 1, and are connected to each other at corresponding portions.

As illustrated in FIG. 6A, a plurality of pixels 71 which are arranged in a matrix, and a vertical scanning unit 73 are provided on the upper substrate 61.

As one of ordinary skill in the art would understand, a matrix form is a form comprising two sets of lines that intersect each other in a generally regular pattern, in which the first set of lines are generally parallel to one of two primary directions that define the matrix and the second set of lines are generally parallel to the other one of the two primary directions. For example, in one common matrix form, the two primary directions are perpendicular to each other and the lines comprising the matrix form a "grid" or "chess board" type pattern. Typically, one of the primary directions defining the matrix is referred to as a column direction and the other of the primary directions is referred to as a row direction (and those of the lines that are parallel to the row directions are referred to as "rows" and those of the lines that are parallel to the column direction are referred to as "columns"). Which of the primary directions is called the column direction and which is called the row direction may be arbitrarily selected.

The orientations of the column direction and the row direction are independent of an external reference frame. In other words, the matrix may be arbitrarily oriented with respect to an external reference frame. Thus, for example, the column direction does not need to be vertical and the row direction does not need to be horizontal. In the accompanying drawings, a vertical direction is referred to as a column direction and a horizontal direction is referred to as a row direction, but it will be understood that this is merely one possible orientation and is not limiting.

Thus, as used in the appended claims "column" and "row" merely denote the two primary directions of the matrix of pixels, and are not limited to any particular orientations relative to an external reference frame (such as a reference frame defined by an electronic apparatus in which the matrix of pixels is included), unless explicitly indicated otherwise. In particular, "column" and "row" need not correspond to a vertical direction and horizontal direction, respectively.

Each of the plurality of pixels 71 is divided into a pixel block 72 which is formed by 1*16 pixels (=row (horizontal)*column (vertical)). In addition, the number of pixels 71 which configure the pixel block 72, that is, an area of the pixel block 72 is set to match with an area of an ADC 81 of the lower substrate 62 which will be described later. The pixel 71 generates a charge corresponding to input light using photoelectric conversion processing, accumulates the charge, and transmits a pixel signal corresponding to the accumulated charge to an ADC 81 of the lower substrate 62 at a scanning timing based on a control from the vertical scanning unit 73.

In addition, the pixel block 72 according to the embodiment is configured by 16 pixels in total of 1*16 pixels, however, the pixel block 72 may be configured by 16*1 pixels by eliminating the vertical scanning unit 73, and by providing a horizontal scanning unit.

As illustrated in FIG. 6B, a plurality of ADCs 81 corresponding to the pixel block 72 of the upper substrate 61, a digital signal processing unit 82, a timing generation unit 83, and a DAC 84 are provided on the lower substrate 62. In addition, in the figure, "a" to "t" denote positions of the ADC 81. For example, an ADC 81 on the upper left is denoted by an ADC 81a. Each ADC 81 converts analog pixel signals which are sequentially transmitted from the plurality of pixels 71 which belong to a corresponding pixel block 82 into digital signals. In addition, since a configuration of the ADC 81 is similar to that of the ADC 31 which is illustrated in FIG. 3, descriptions thereof will be omitted.

In addition, in FIGS. 6A and 6B, due to limitations of space, only 20*16 pixels of the pixel 71, and 5*4 ADCs of the ADC 81 are illustrated, however, as a matter of course, the number of pixels 71 is an enormous number of ten thousand units, and the number of pixel blocks 72, and the number of ADCs 81 is also a huge number as values in which the number of pixels 71 is divided by 16.

Figure 7:
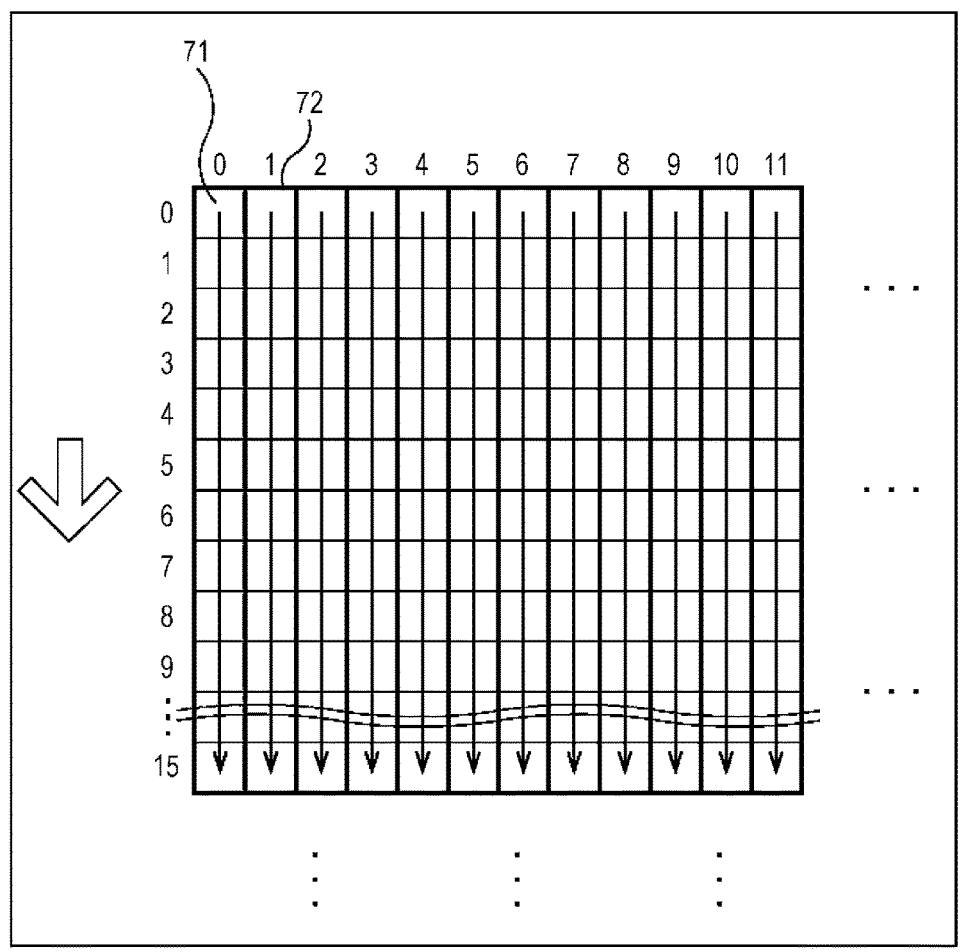
FIG. 7 is a diagram which illustrates scanning order of pixels in each pixel block in FIG. 6A.
Figure 8:
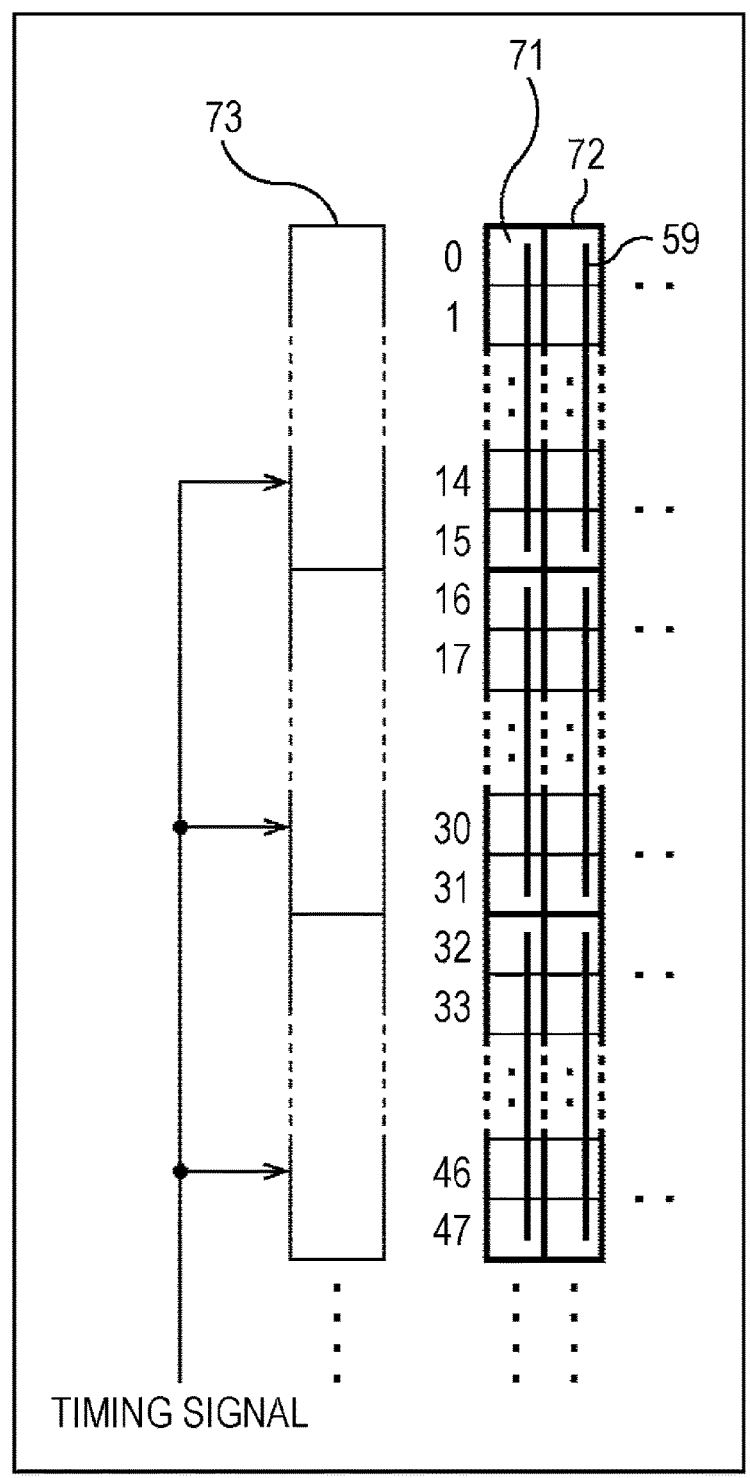
FIG. 8 is a diagram which illustrates the scanning order of pixels in each pixel block in FIG. 6A.

FIGS. 7 and 8 illustrate scanning order of 16 pixels in each pixel block 72 of the upper substrate 61. In the figure, a rectangle of a thin line denotes a pixel 71, a thick line denotes a pixel block 72 which is correlated with one ADC 81, numbers denote positions of pixels, and arrows denote scanning order of pixels. In addition, a pixel 71 located on an X row and a Y column is described as a pixel (X,Y).

The sixteen pixels 71 which configure each pixel block 72 are provided with a common vertical signal line 59, and the rear stage of the vertical signal line 59 is connected to a corresponding ADC 81.

A pixel block $72_{0,0}$ in which sixteen pixels 71 are aligned in the column (vertical) direction in which a pixel (0,0) is the upper end is correlated with an ADC 81a. A pixel block $72_{0,1}$ which is a right neighbor of the pixel block $72_{0,0}$ is correlated with a ADC 81f which is lower neighbor of the ADC 81a. A pixel block $72_{0,2}$ which is a right neighbor of the pixel block $72_{0,1}$ is correlated with an ADC 81k which is a lower neighbor of the ADC 81f. A pixel block $72_{0,3}$ which is a right neighbor of the pixel block $72_{0,2}$ is correlated with an ADC 81p which is a lower neighbor of the ADC 81k.

That is, a pixel block 72 and an ADC 81 corresponding thereto are set so that areas thereof match with each other, and shapes thereof are different from each other. In addition, four pixel blocks 72 which are neighboring in the row (horizontal) direction, (for example, pixel block $72_{0,0}$, pixel block $72_{0,1}$, pixel block $72_{0,2}$, and pixel block $72_{0,3}$) are correlated with four ADCs 81 (for example, ADC 81a, ADC 81f, ADC 81k, and ADC 81p) which are neighboring in the column (vertical) direction, in a unit thereof.

The vertical scanning unit 73 is repeated by 16 rows corresponding to a separation of the pixel block 72, and operates in parallel by a common timing signal. In this manner, in the whole pixel block 72, pixels are sequentially scanned from the upper end pixel 71 to lower end in the column direction at the same time. Accordingly, in the pixel block 72, switching of scanning in the row (horizontal) direction is not necessary. In addition, it is possible to read out pixel signals from all of pixels 71 configuring an image using scanning of sixteen times, regardless of a size of the image.

Figure 9:
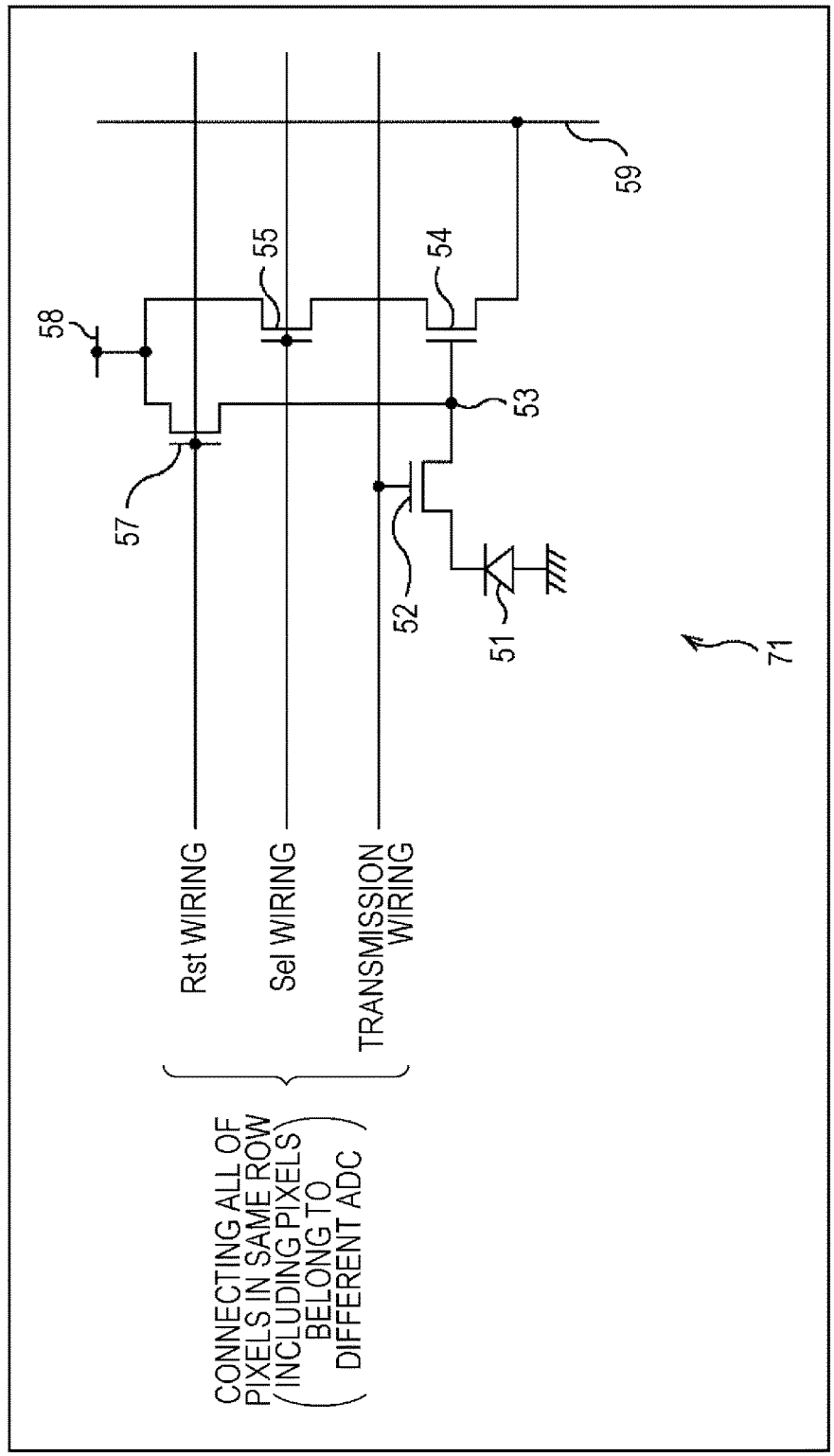
FIG. 9 is a diagram which illustrates a first configuration example of a pixel in which the scanning order in FIG. 7 is executed.

FIG. 9 illustrates a configuration example of each pixel 71 for executing the scanning order of the pixel block 72 which is illustrated in FIG. 7.

Figure 5:
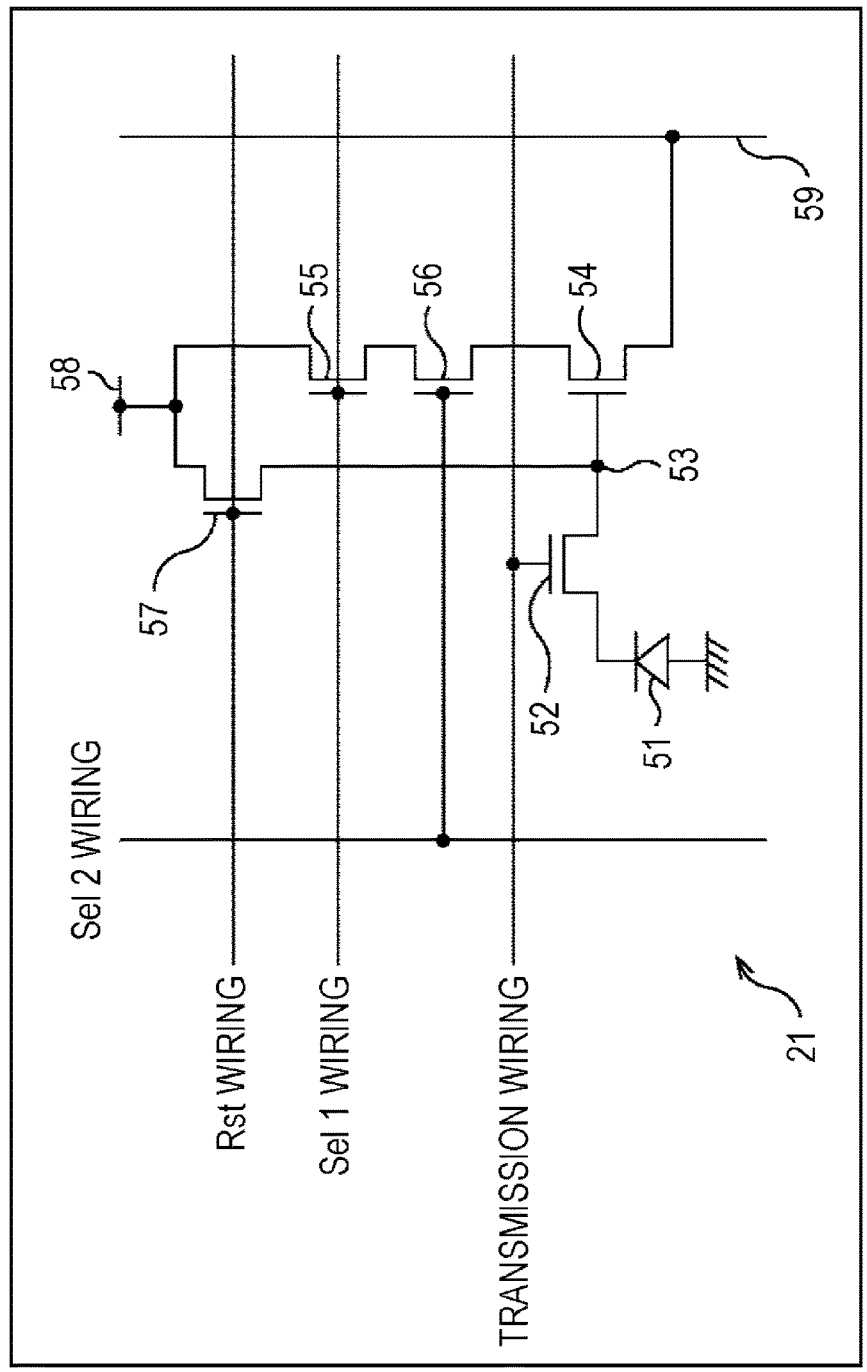
FIG. 5 is a diagram which illustrates a configuration example of a pixel in which the scanning order in FIG. 4 is executed.

In addition, in constituent devices of the pixel 71 which is illustrated in FIG. 9, since common constituent devices to the pixel 21 which is illustrated in FIG. 5 as an example in the related art are given common numbers, descriptions thereof will be omitted. In the first configuration example of the pixel 71, the Sel (selection transistor for horizontal scanning) 56 is eliminated from the pixel 21 in FIG. 5, as is clarified by comparing FIGS. 5 and 9 with each other. Accordingly, the first configuration example of the pixel 71 can be configured to be simpler than the pixel 21. In addition, since it is possible to make layout of wiring common in each pixel block 72, as well, miniaturization in a pixel unit and CIS unit, or reducing in cost can be realized. In addition, since the sixteen pixels 71 which belong to the same pixel block 72 are connected through one common vertical signal line, and are subject to approximately the same wiring layout, it is possible to suppress irregularity in characteristics between pixels.

In the first configuration example of the pixel 71, a charge which is generated in the PD 51 as a photoelectric conversion device is transmitted to the FD 53 which is connected to a gate of the Amp 54 through the Trf 52. At this time, when the Sel 55 which is controlled by the vertical scanning unit 73 is turned on, the Amp 54 outputs a voltage signal corresponding to a potential of the charge which is maintained in the FD 53 to an ADC 31 in the rear stage through the vertical signal line 59. In addition, the charge which is accumulated in the FD 53 is thrown to the power source wiring 58 when the Rst 57 is turned on.

As described above, in a case of the first configuration example, it is possible to read out the pixel 71 on the entire screen using scanning of 16 times, regardless of a size of an image. However, in other words, 16 times of scanning is necessary regardless of a size of an image. This is not a problem when there is no motion in an object, however, when there is a motion, there may be a problem in that noise such as lines occurs at a position of an image corresponding to a boundary of the pixel block 72.

Figure 10:
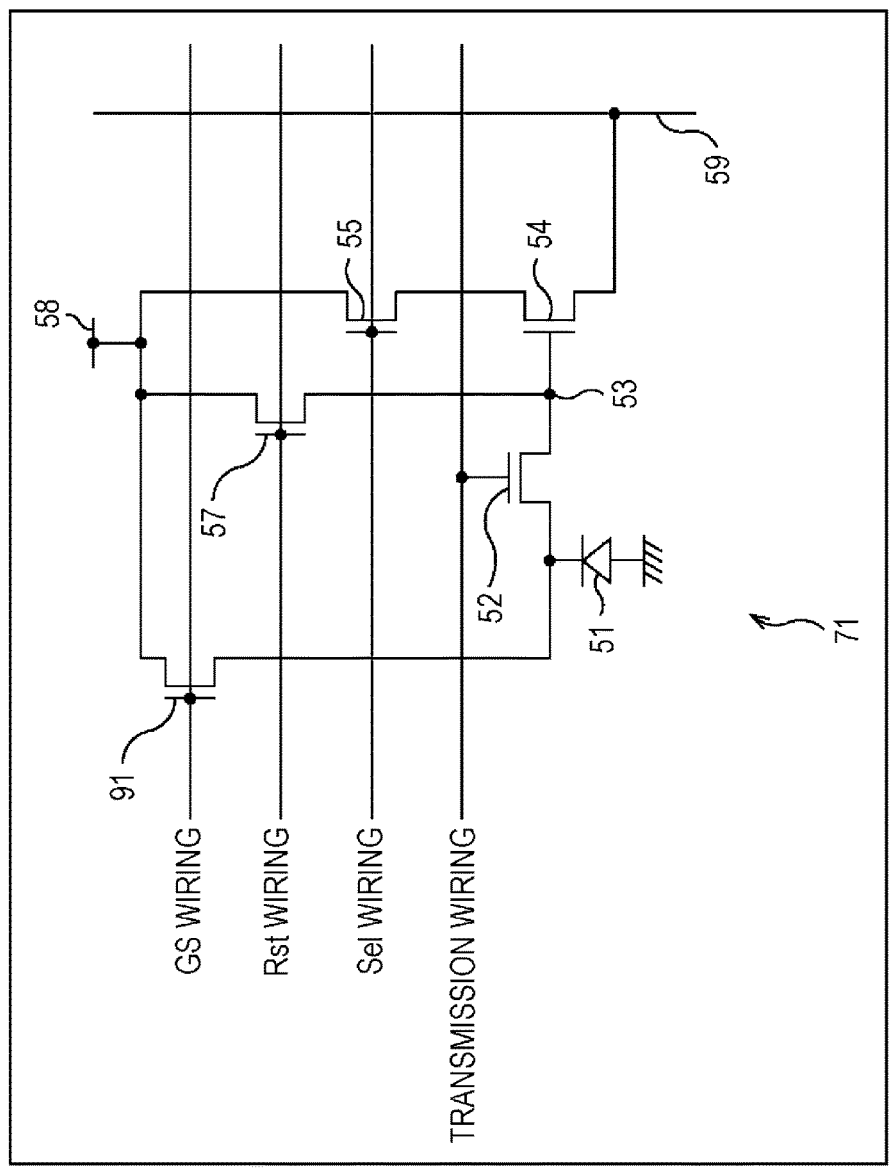
FIG. 10 is a diagram which illustrates a second configuration example in which the scanning order in FIG. 7 is executed.

FIG. 10 illustrates a second configuration example of the pixel 71 for solving the problem. The second configuration example is an example in which the pixel 71 includes a global shutter function.

In addition, in constituent devices of the pixel 71 which is illustrated in FIG. 10, since constituent devices which are common to the pixel 21 illustrated in FIG. 5 are given common numbers, descriptions thereof will be omitted. In the second configuration example of the pixel 71, the Sel (selection transistor for horizontal scanning) 56 is eliminated from the pixel 21 in FIG. 5, and a global shutter transistor (GS) 91 is added, as is clarified by comparing FIGS. 5 and 10 with each other.

In the GS 91, common GS wiring is connected to the entire pixel 71, one end thereof is connected to the PD 51, and the other end is connected to the power source wiring 58.

In the second configuration example of the pixel 71, in the entire pixel 71, the GS 91 is turned on before exposure at a common timing, and the exposure is started after the charge in the PD 51 is thrown to the power source wiring 58. Thereafter, in the entire pixel 71, the Trf 52 is turned on at a common timing, and the charge which is generated in the PD 51 is transmitted to the FD 53 which is connected to a gate of the Amp 54. In addition, since the Sel 55 which is controlled by the vertical scanning unit 73 is turned on before transmitting the charge to the FD 53, the Amp 54 outputs a voltage signal corresponding to a potential of the charge which is accumulated in the FD 53 to an ADC 31 in the rear stage through the vertical signal line 59. In addition, the charge which is accumulated in the FD 53 is thrown to the power source wiring 58 when the Rst 57 is turned on.

In a case of the second configuration of the pixel 71, since exposure timings can be made common in the entire pixel 71, it is possible to prevent a problem of generation of noise such as lines from occurring at a position of an image corresponding to a boundary of the pixel block 72. In addition, in order to include the function of the global shutter, for example, another signal maintaining node may be included between the PD 51 and the FD 53, instead of the GS 91.

<Application Example of Solid-State Imaging Device 60>

Figure 11:
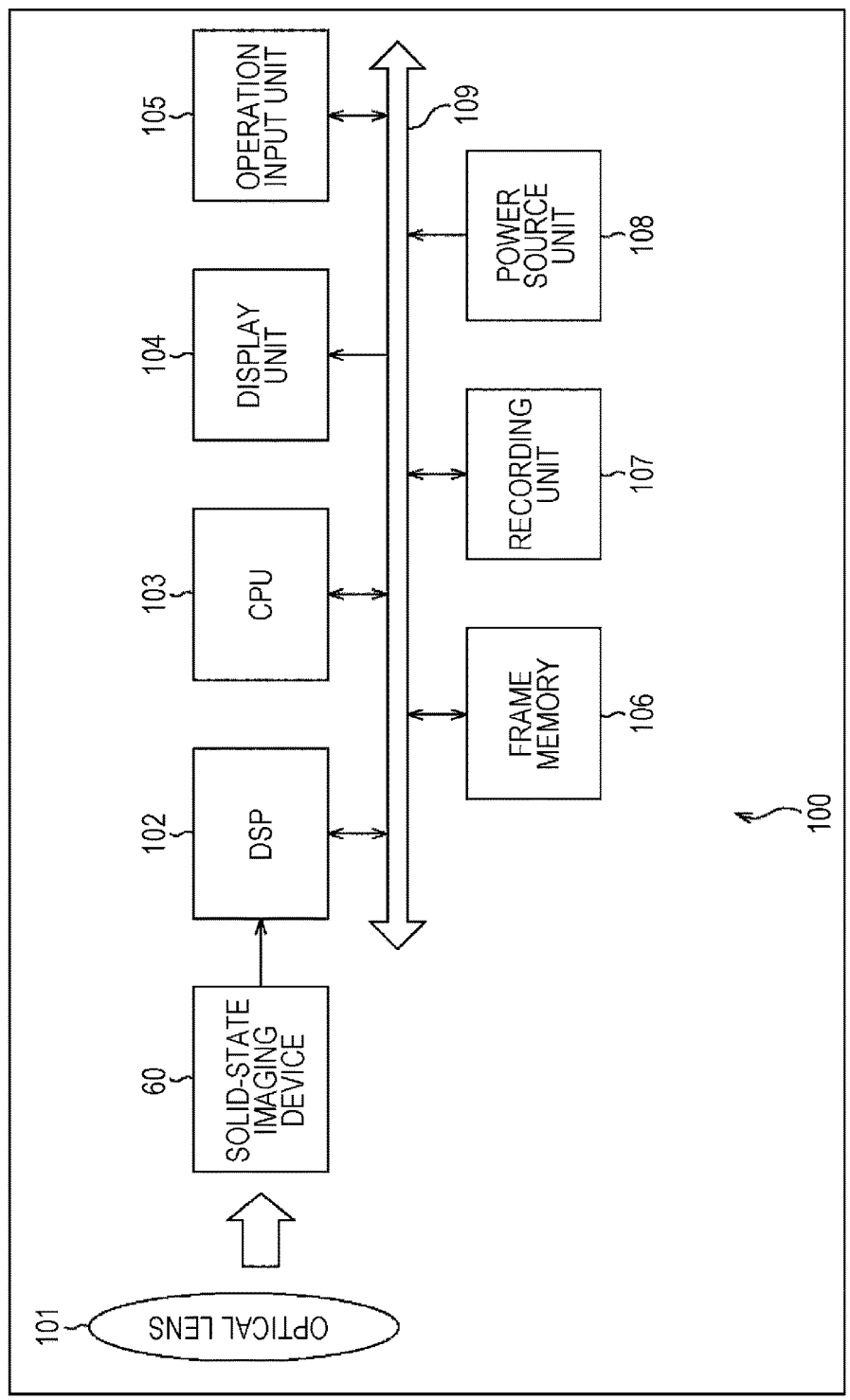
FIG. 11 is a block diagram which illustrates a configuration example of an imaging apparatus according to the present disclosure.

FIG. 11 illustrates a configuration example of an imaging apparatus 100 on which a solid-state imaging device 60 is mounted. In the imaging apparatus 100, the solid-state imaging device 60 performs photoelectric conversion processing according to input light which is condensed by an optical lens 101, and outputs a digital image signal based on a charge which is generated as a result thereof to a DSP 102. The imaging apparatus 100 can be used for sensing, for example.

In addition, the embodiment of the present disclosure is not limited to the above described embodiment, and can be variously modified without departing from the scope of the present disclosure. For example, at least the following configurations are within the scope of the present disclosure:

(Configuration 1)

An imaging device, comprising:

a pixel region that includes a plurality of pixels arranged in a matrix form in rows and columns and grouped into pixel-units that each include N pixels, where N>1, each of the columns includes pixels from at least two of the pixel-units, and each of the plurality of pixels is configured to sense light and output a pixel signal to one of a plurality of readout lines, each of the plurality of readout lines being connected to the pixels of a corresponding one of the pixel-units;

a scanning unit that extends in a column direction and that is configured to select pixels for readout by applying scanning pulses to scan lines that are each connected to a corresponding row of pixels; and a plurality of readout units, each connected to a corresponding one of the plurality of readout lines and configured to perform analog-to-digital conversion on pixel signals output thereto, wherein there is no scanning unit that extends in a row direction and that applies pulses to lines connected to columns of pixels for enabling said selecting pixels for readout.

(Configuration 2)

The imaging device of configuration 1, further comprising:

a plurality of substrates stacked upon each other, wherein the pixel region and the scanning unit are disposed on a different one of the plurality of substrates than the plurality of readout units.

(Configuration 3)

The imaging device of any one of configurations 1 and 2, wherein, for each of the plurality of readout units, a shape of a layout region thereof is different from a shape of a layout region of one of the pixel-units.

(Configuration 4)

The imaging device of any one of configurations 1-3, wherein, for each of the plurality of readout units, a two-dimensional area of the layout region thereof is equal to a two-dimensional area of the layout region of one of the pixel-units.

(Configuration 5)

The imaging device of any one of configurations 1-4, wherein, for each of the pixel-units, all of the pixels that are included in the respective pixel-unit are in a same column.

(Configuration 6)

The imaging device of any one of configurations 1-5, wherein each of the plurality of pixels comprises:

a sensing element configured to perform photoelectric conversion on incident light, a readout element configured to receive charge generated by the sensing element and to output the pixel signal when the pixel is selected for readout, a transfer element disposed between the sensing element and an input terminal of the readout element, the transfer element being configured to control a charge transfer operation of transferring charge generated in the sensing element to the input terminal of the readout element, a reset element disposed between the input terminal of the readout element and a reset potential line, the reset element being configured to control a reset operation of clearing charge from the input terminal of the readout element, and a selection transistor that controls selection of the respective pixel for readout independently of any other active circuit elements included within the respective pixel, a conduction state of the selection transistor being controlled by the scanning pulses applied to one of the scan lines, which is connected to a gate of the selection transistor.

(Configuration 7)

The imaging device of any one of configurations 1-6, wherein, each of the plurality of pixels includes a sensing element configured to perform photoelectric conversion on incident light and a readout element configured to receive charge generated by the sensing element and to output the pixel signal when the pixel is selected for readout, and for each of the plurality of pixels:

the readout element outputs the pixel signal when a power supply terminal thereof is conductively connected to a power supply line carrying a power supply potential, a first switching element is disposed in a current path between the power supply terminal of the readout element and the power supply line, a conduction state of the first switching element being controlled by the scanning pulses applied to one of the scan lines, which is connected to a control terminal of the first switching element, and no switching element besides the first switching element is disposed in the current path between the power supply terminal of the readout element and the power supply line.

(Configuration 8)

The imaging device of any one of configurations 1-7, wherein, for each of the plurality of pixels, the readout element is a first transistor configured as an amplifier and the first switching element is a second transistor configured as a switch, a first current electrode of the first transistor is said power supply terminal and is connected to a current electrode of the second transistor, a second current electrode of the first transistor is connected to one of the readout lines, and charge generated by the sensing element is received on a gate electrode of the first transistor, and a gate electrode of the second transistor is the control terminal.

(Configuration 9)

The imaging device of any one of configurations 1-8, wherein each of the plurality of pixels further comprises:

a second switching element disposed between the sensing element and an input terminal of the readout element, the second switching element being configured to control a charge transfer operation of transferring charge generated in the switching element to the input terminal of the readout element, and a third switching element disposed between the input terminal of the readout element and a reset potential line, the third switching element being configured to control a reset operation of clearing charge from the input terminal of the readout element.

(Configuration 10)

The imaging device of any one of configurations 1-9, wherein each of the plurality of pixels further comprises a fourth switching element disposed between the sensing element and a second reset potential line, the third switching element being configured to control starting of a charge integrating period in the sensing element.

(Configuration 11)

The imaging device of any one of configurations 1-10, wherein the power supply line, the reset potential line, and the second reset potential line are all the same line.

(Configuration 12)

The imaging device of any one of configurations 1-11, further comprising transfer selection lines, reset selection lines, and global shutter selection lines, each connected to pixels in a corresponding row, wherein for each of the plurality of pixels, the second switching element is controlled by one of the transfer selection lines, the third switching element is controlled by one of the reset lines, and the fourth switching element is controlled by one of the global shutter selection lines.

(Configuration 13)

The imaging device of any one of configurations 1-12, wherein a two-dimensional area of a layout region of each of the plurality of readout units is equal to N*A, where A is a two-dimensional area of a layout region of one of the plurality of pixels.

(Configuration 14)

An electronic apparatus comprising the imaging device of any one of configurations 1-13.

(Configuration 15)

A method of driving an image sensor comprising a pixel region that includes a plurality of pixels arranged in a matrix form in rows and columns and grouped into pixel-units that each include N pixels, where N>1, each of the columns includes pixels from at least two of the pixel-units, and each of the plurality of pixels is configured to sense light and output a pixel signal to one of a plurality of readout lines, each of the plurality of readout lines being connected to the pixels of a corresponding one of the pixel-units; and a plurality of readout units, each connected to a corresponding one of the plurality of readout lines and configured to perform analog-to-digital conversion on pixel signals output thereto, the method comprising:

selecting pixels for readout by applying scanning pulses to scan lines that are each connected to a corresponding row of pixels, wherein said selecting pixels for readout does not depend upon the application of any pulses to a line that is connected to a column of pixels.

(Configuration 16)

The method of configuration 15, wherein each of the plurality of pixels includes a sensing element configured to perform photoelectric conversion on incident light and a readout element configured to receive charge generated by the sensing element and to output the pixel signal when the pixel is selected for readout, the method further comprising:

prior to said selecting pixels for readout:

performing a global shutter operation of causing all of the plurality of pixels to simultaneously begin a charge integration period, and performing a transfer operation of causing pixels to transfer charge generated in their respective sensing elements to their respective readout elements, and after said selecting pixels for readout, performing a reset operation of clearing charge from readout elements of those pixels that have been read out.

(Configuration 17)

The method of any one of configurations 15 and 16, wherein the image sensor further comprises a plurality of substrates stacked upon each other, wherein the pixel region and the scanning unit are disposed on a different one of the plurality of substrates than the plurality of readout units.

(Configuration 18)

The method of any one of configurations 15-17, wherein, for each of the plurality of readout units, a shape of a layout region thereof is different from a shape of a layout region of one of the pixel-units.

(Configuration 19)

The method of any one of configurations 15-18, wherein, for each of the plurality of readout units, a two-dimensional area of the layout region thereof is equal to a two-dimensional area of the layout region of one of the pixel-units.

(Configuration 20)

The method of any one of configurations 15-19, wherein, for each of the pixel-units, all of the pixels that are included in the respective pixel-unit are in a same column.

(Configuration 21)

The method of any one of configurations 15-20, wherein each of the plurality of pixels comprises:

a sensing element configured to perform photoelectric conversion on incident light, a readout element configured to receive charge generated by the sensing element and to output the pixel signal when the pixel is selected for readout, a transfer element disposed between the sensing element and an input terminal of the readout element, the transfer element being configured to control a charge transfer operation of transferring charge generated in the sensing element to the input terminal of the readout element, a reset element disposed between the input terminal of the readout element and a reset potential line, the reset element being configured to control a reset operation of clearing charge from the input terminal of the readout element, and a selection transistor that controls selection of the respective pixel for readout independently of any other active circuit elements included within the respective pixel, a conduction state of the selection transistor being controlled by the scanning pulses applied to one of the scan lines, which is connected to a gate of the selection transistor.

(Configuration 22)

The method of any one of configurations 15-21, wherein, each of the plurality of pixels includes a sensing element configured to perform photoelectric conversion on incident light and a readout element configured to receive charge generated by the sensing element and to output the pixel signal when the pixel is selected for readout, and for each of the plurality of pixels:

the readout element outputs the pixel signal when a power supply terminal thereof is conductively connected to a power supply line carrying a power supply potential, a first switching element is disposed in a current path between the power supply terminal of the readout element and the power supply line, a conduction state of the first switching element being controlled by the scanning pulses applied to one of the scan lines, which is connected to a control terminal of the first switching element, and no switching element besides the first switching element is disposed in the current path between the power supply terminal of the readout element and the power supply line.

(Configuration 23)

The method of any one of configurations 15-22, wherein, for each of the plurality of pixels, the readout element is a first transistor configured as an amplifier and the first switching element is a second transistor configured as a switch, a first current electrode of the first transistor is said power supply terminal and is connected to a current electrode of the second transistor, a second current electrode of the first transistor is connected to one of the readout lines, and charge generated by the sensing element is received on a gate electrode of the first transistor, and a gate electrode of the second transistor is the control terminal.

(Configuration 24)

The method of any one of configurations 15-23, wherein each of the plurality of pixels further comprises:

a second switching element disposed between the sensing element and an input terminal of the readout element, the second switching element being configured to control a charge transfer operation of transferring charge generated in the switching element to the input terminal of the readout element, and a third switching element disposed between the input terminal of the readout element and a reset potential line, the third switching element being configured to control a reset operation of clearing charge from the input terminal of the readout element.

(Configuration 25)

The method of any one of configurations 15-24, wherein each of the plurality of pixels further comprises a fourth switching element disposed between the sensing element and a second reset potential line, the third switching element being configured to control starting of a charge integrating period in the sensing element.

(Configuration 26)

The method of any one of configurations 15-25, wherein the power supply line, the reset potential line, and the second reset potential line are all the same line.

(Configuration 27)

The method of any one of configurations 15-26, further comprising transfer selection lines, reset selection lines, and global shutter selection lines, each connected to pixels in a corresponding row, wherein for each of the plurality of pixels, the second switching element is controlled by one of the transfer selection lines, the third switching element is controlled by one of the reset lines, and the fourth switching element is controlled by one of the global shutter selection lines.

(Configuration 28)

The method of any one of configurations 15-27, wherein a two-dimensional area of a layout region of each of the plurality of readout units is equal to N*A, where A is a two-dimensional area of a layout region of one of the plurality of pixels.

(Configuration 29)

An electronic apparatus comprising the imaging device of any one of configurations 1-13.

(Configuration 30)

An imaging device, comprising:

a pixel region that includes a plurality of pixels arranged in rows and columns and grouped into pixel-units that each include N pixels, where N>1, each of the columns includes pixels from at least two of the pixel-units, and each of the plurality of pixels is configured to sense light and output a pixel signal to one of a plurality of readout lines when selected for readout, each of the plurality of readout lines being connected to the pixels of a corresponding one of the pixel-units;

a scanning unit that extends in a column direction and that is configured to select pixels for readout by applying scanning pulses to scan lines that are each connected to a corresponding row of pixels; and a plurality of readout units, each connected to a corresponding one of the plurality of readout lines and configured to perform analog-to-digital conversion on pixel signals output thereto, wherein each scanning pulse selects for readout those pixels that are connected to the scan line to which the respective scanning pulse is applied independently of any other selection signal.

(Configuration 31)

The imaging device of configuration 30, further comprising:

a plurality of substrates stacked upon each other, wherein the pixel region and the scanning unit are disposed on a different one of the plurality of substrates than the plurality of readout units.

(Configuration 32)

The imaging device of any one of configurations 30 and 31, wherein, for each of the plurality of readout units, a shape of a layout region thereof is different from a shape of a layout region of one of the pixel-units.

(Configuration 33)

The imaging device of any one of configurations 30-32, wherein, for each of the plurality of readout units, a two-dimensional area of the layout region thereof is equal to a two-dimensional area of the layout region of one of the pixel-units.

(Configuration 34)

The imaging device of any one of configurations 30-33, wherein, for each of the pixel-units, all of the pixels that are included in the respective pixel-unit are in a same column.

(Configuration 35)

The imaging device of any one of configurations 30-34, wherein each of the plurality of pixels comprises:

a sensing element configured to perform photoelectric conversion on incident light, a readout element configured to receive charge generated by the sensing element and to output the pixel signal when the pixel is selected for readout, a transfer element disposed between the sensing element and an input terminal of the readout element, the transfer element being configured to control a charge transfer operation of transferring charge generated in the sensing element to the input terminal of the readout element, a reset element disposed between the input terminal of the readout element and a reset potential line, the reset element being configured to control a reset operation of clearing charge from the input terminal of the readout element, and a selection transistor that controls selection of the respective pixel for readout independently of any other active circuit elements included within the respective pixel, a conduction state of the selection transistor being controlled by the scanning pulses applied to one of the scan lines, which is connected to a gate of the selection transistor.

(Configuration 36)

The imaging device of any one of configurations 30-35, wherein, each of the plurality of pixels includes a sensing element configured to perform photoelectric conversion on incident light and a readout element configured to receive charge generated by the sensing element and to output the pixel signal when the pixel is selected for readout, and for each of the plurality of pixels:

the readout element outputs the pixel signal when a power supply terminal thereof is conductively connected to a power supply line carrying a power supply potential, a first switching element is disposed in a current path between the power supply terminal of the readout element and the power supply line, a conduction state of the first switching element being controlled by the scanning pulses applied to one of the scan lines, which is connected to a control terminal of the first switching element, and no switching element besides the first switching element is disposed in the current path between the power supply terminal of the readout element and the power supply line.

(Configuration 37)

The imaging device of any one of configurations 30-36, wherein, for each of the plurality of pixels, the readout element is a first transistor configured as an amplifier and the first switching element is a second transistor configured as a switch, a first current electrode of the first transistor is said power supply terminal and is connected to a current electrode of the second transistor, a second current electrode of the first transistor is connected to one of the readout lines, and charge generated by the sensing element is received on a gate electrode of the first transistor, and a gate electrode of the second transistor is the control terminal.

(Configuration 38)

The imaging device of any one of configurations 30-37, wherein each of the plurality of pixels further comprises:

a second switching element disposed between the sensing element and an input terminal of the readout element, the second switching element being configured to control a charge transfer operation of transferring charge generated in the switching element to the input terminal of the readout element, and a third switching element disposed between the input terminal of the readout element and a reset potential line, the third switching element being configured to control a reset operation of clearing charge from the input terminal of the readout element.

(Configuration 39)

The imaging device of any one of configurations 30-38, wherein each of the plurality of pixels further comprises a fourth switching element disposed between the sensing element and a second reset potential line, the third switching element being configured to control starting of a charge integrating period in the sensing element.

(Configuration 40)

The imaging device of any one of configurations 30-39, wherein the power supply line, the reset potential line, and the second reset potential line are all the same line.

(Configuration 41)

The imaging device of any one of configurations 30-40, further comprising transfer selection lines, reset selection lines, and global shutter selection lines, each connected to pixels in a corresponding row, wherein for each of the plurality of pixels, the second switching element is controlled by one of the transfer selection lines, the third switching element is controlled by one of the reset lines, and the fourth switching element is controlled by one of the global shutter selection lines.

(Configuration 42)

The imaging device of any one of configurations 30-41, wherein a two-dimensional area of a layout region of each of the plurality of readout units is equal to N*A, where A is a two-dimensional area of a layout region of one of the plurality of pixels.

(Configuration 43)

An electronic apparatus comprising the imaging device of any one of configurations 30-42.

REFERENCE SIGNS LIST

60 SOLID-STATE IMAGING DEVICE
61 UPPER SUBSTRATE
62 LOWER SUBSTRATE
71 PIXEL
72 PIXEL BLOCK
81 ADC
100 IMAGING APPARATUS

The invention claimed is:

1. An imaging device, comprising:
a first substrate including a plurality of pixels grouped into pixel-units, each pixel unit including N pixels, where N>1; and
a second substrate including a plurality of readout units, each connected to a corresponding one of the pixel-units and configured to perform analog-to-digital conversion, wherein the first substrate is stacked on the second substrate; and
a metal-metal bond between one of the pixel-units and one of the readout units,
wherein,
each of the pixels includes a photodiode, a transfer transistor, a floating diffusion, an amplification transistor, a first selection transistor, and a second selection transistor,
a gate of the first selection transistor connects to a first control line extending along a row direction,
a gate of the second selection transistor connects to a second control line extending along a column direction, and
a shape of a layout region of one of the readout units is different from a shape of a layout region of one of the pixel-units.

2. The imaging device of claim 1, wherein a two-dimensional area of the layout region of one of the readout units is equal to a two-dimensional area of the layout region of one of the pixel-units.

3. The imaging device of claim 1, wherein the metal-metal bond includes copper.

4. An imaging device, comprising:
a first substrate including a plurality of pixels grouped into pixel-units, each pixel unit including N pixels, where N>1;
a second substrate including a plurality of readout units, each connected to a corresponding one of the pixel-units and configured to perform analog-to-digital conversion, wherein the first substrate is stacked on the second substrate; and
a metal-metal bond between one of the pixel-units and one of the readout units,
wherein,
each of the pixels includes a photodiode, a transfer transistor, a floating diffusion, an amplification transistor, a selection transistor, and a global shutter transistor,
each of the pixels performs a global shutter operation, and
a shape of a layout region of one of the readout units is different from a shape of a layout region of one of the pixel-units.

5. The imaging device of claim 4, wherein a two-dimensional area of the layout region of one of the readout units is equal to a two-dimensional area of the layout region of one of the pixel-units.

6. The imaging device of claim 4, wherein the metal-metal bond includes copper.

7. An imaging device, comprising:
a first substrate including a plurality of pixels grouped into pixel-units, each pixel unit including N pixels, where N>1; and
a second substrate including a plurality of readout units, each connected to a corresponding one of the pixel-units and configured to perform analog-to-digital conversion, wherein the first substrate is stacked on the second substrate; and
a metal-metal bond between one of the pixel-units and one of the readout units,
wherein,
each of the pixels includes a photodiode, a transfer transistor, a floating diffusion, an amplification transistor, and a selection transistor,
a gate of the selection transistor connects to a control line extending along a row direction, and
a shape of a layout region of one of the readout units is different from a shape of a layout region of one of the pixel-units.

8. The imaging device of claim 7, wherein a two-dimensional area of the layout region of one of the readout units is equal to a two-dimensional area of the layout region of one of the pixel-units.

9. The imaging device of claim 7, wherein the metal-metal bond includes copper.

* * * * *